June 18, 1929.   W. C. WARD   1,717,533
CUSHIONED CAR FOR AIRCRAFT
Filed Jan. 9, 1928
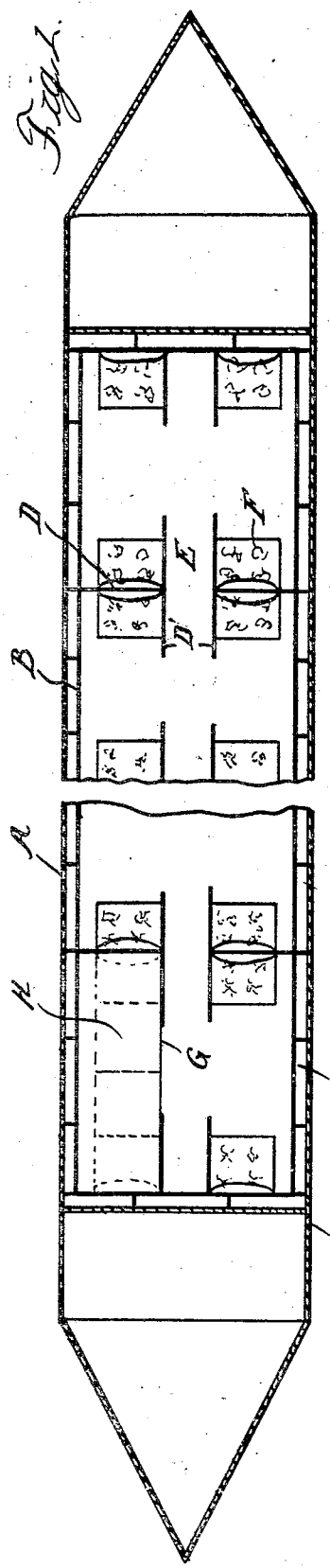
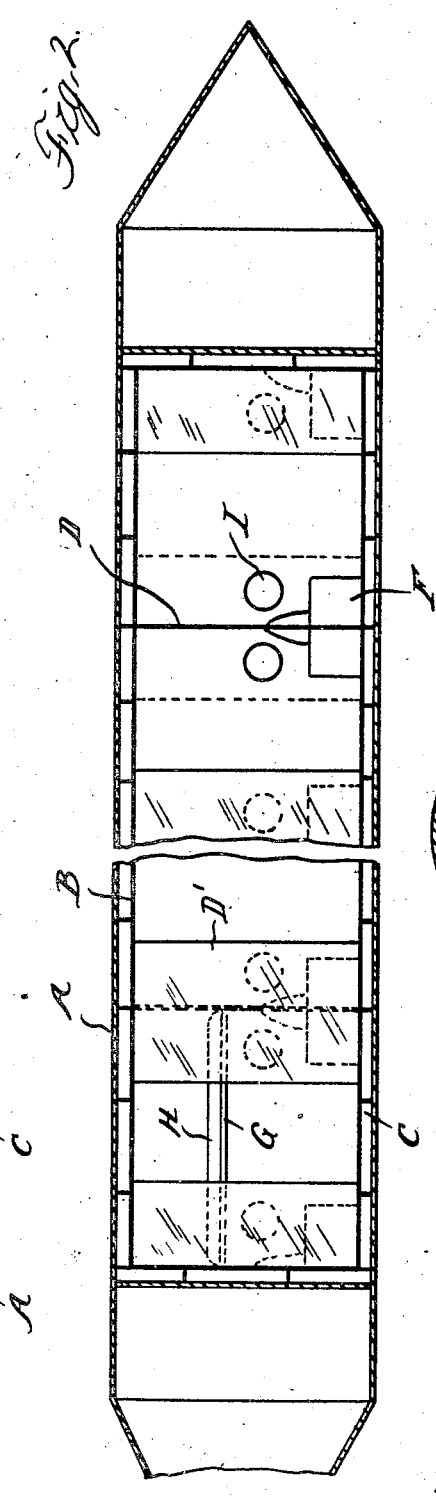
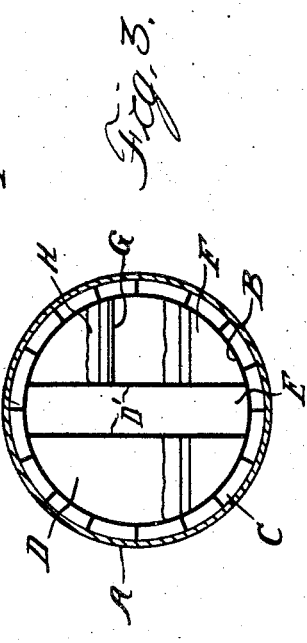
Inventor
Willis C. Ward
Attorneys Patented June 18, 1929.

1,717,533

UNITED STATES PATENT OFFICE.

WILLIS C. WARD, OF ORCHARD LAKE, MICHIGAN.

CUSHIONED CAR FOR AIRCRAFT.

Application filed January 9, 1928. Serial No. 245,588.

The invention relates generally to aircraft being more particularly designed for use on lighter than air constructions but also applicable to the heavier than air machines. It is the object of the invention to provide a construction of car which is so cushioned as to greatly lessen the injury to occupants in case of a fall. To this end the invention consists in the construction as hereinafter set forth.

In the drawings:

Figure 1 is a vertical longitudinal section through my improved construction of car.

Figure 2 is a horizontal section thereof.

Figure 3 is a cross section thereof.

With lighter than air aircraft it is quite usual to provide a car of substantially cylindrical form with tapering ends which is suspended below the gas bag. This car may be capable of carrying a large number of passengers and is provided with seats for the same and in some instances with berths for sleeping accommodation. My improvement consists essentially in so constructing the interior of this car as to provide first pneumatically cushioned walls and second suspensions for the seats and berths which will hold the passenger out of direct contact with said walls.

As specifically shown A is the outer shell preferably a metal cylinder and B is the passenger compartment within the shell. This compartment has the walls thereof lined with pneumatic cushions C arranged both around the circumference of the shell and at the opposite ends of the compartment. The main compartment B is further divided by a series of cross partitions D into smaller compartments in which are located the seats and berths. These partitions D which are preferably made of fabric extend between the upper and lower walls of the cylinder on opposite sides of the center thereof so as to leave therebetween an aisle E extending the full length of the main compartment. D' are longitudinally extending vertical partitions arranged on opposite sides of the aisle and leaving openings between the same for entering the smaller compartments from the aisle. Attached to and suspended by the partitions D' and the outer wall or shell are seats F which are arranged in opposite pairs so as to be capable of conversion into a sleeping berth. I also preferably arrange horizontal partitions G between the partitions D and above the seats so as to form thereof an upper berth. These seats and berths may be provided with the necessary cushions and mattresses such as H these being preferably pneumatic. The shell of the car is also provided with port holes I for light and ventilation.

With the construction as described in case of an accident which permits the car to fall, the passengers are protected from the shock first by the suspension seats or berths and second by the pneumatic cushions which line the walls. The fact that the seats and berths are suspended by a fabric partition instead of a more rigid structure lessens the impact while the pneumatic lining provides further cushioning means after failure of the partitions. In case the car should fall endwise the transverse partitions would successively fall but in so doing would break the fall of the occupants of the seats and berths. Thus, without interfering with convenience in arrangement I have introduced a large factor of safety.

While I have described the use of pneumatic cushions both for lining the shell and for use on the seats and berths it is obvious that cushions stuffed with down or similar material might be used in place thereof.

What I claim as my invention:

1. A car for aircraft comprising an outer metallic shell, a pneumatic cushioned lining for said shell, fabric partitions extending across said shell and passenger seats suspended from said partitions.

2. A car for aircraft comprising an outer cylindrical metallic shell, a pneumatic cushioned lining for said shell fabric, partitions extending vertically across said shell on opposite sides of the center thereof to leave a continuous central aisle and seats suspended from and arranged between said partitions and the shell.

3. A car for aircraft comprising an outer metallic shell, a fabric partition extending across said shell and a passenger seat suspended from said partition.

In testimony whereof I affix my signature.

WILLIS C. WARD.